(12) United States Patent
Xu

(10) Patent No.: US 9,796,208 B2
(45) Date of Patent: Oct. 24, 2017

(54) MULTIFUNCTIONAL PEN

(71) Applicants: Tonglu Jinbang Pen Industry Co., Ltd., Hangzhou (CN); TongLu IDO IMP & EXP Co., Ltd, Hangzhou (CN)

(72) Inventor: Kuanfei Xu, Hangzhou (CN)

(73) Assignees: TONGLU JINBANG PEN INDUSTRY CO., LTD., Hangzhou (CN); TONGLU IDO IMP & EXP CO., LTD, Hangzhou (CN)

( * ) Notice: Subject to any disclaimer, the term of this patent is extended or adjusted under 35 U.S.C. 154(b) by 53 days.

(21) Appl. No.: 15/021,947

(22) PCT Filed: Nov. 16, 2015

(86) PCT No.: PCT/CN2015/094653
§ 371 (c)(1),
(2) Date: Mar. 15, 2016

(87) PCT Pub. No.: WO2016/078554
PCT Pub. Date: May 26, 2016

(65) Prior Publication Data
US 2016/0297233 A1    Oct. 13, 2016

(30) Foreign Application Priority Data

Nov. 19, 2014  (CN) .................... 2014 2 0692610 U

(51) Int. Cl.
*B43K 29/00* (2006.01)
*B43K 3/00* (2006.01)
*B43K 25/02* (2006.01)

(52) U.S. Cl.
CPC ............... *B43K 29/00* (2013.01); *B43K 3/00* (2013.01); *B43K 25/02* (2013.01)

(58) Field of Classification Search
CPC combination set(s) only.
See application file for complete search history.

(56) References Cited

U.S. PATENT DOCUMENTS

| 3,963,914 | A | * | 6/1976 | Browning | ............... | B43K 29/10 |
|---|---|---|---|---|---|---|
| | | | | | | 362/118 |
| 4,786,197 | A | * | 11/1988 | Koeln | .................... | B43K 24/06 |
| | | | | | | 401/109 |
| 5,913,629 | A | * | 6/1999 | Hazzard | ................ | B43K 5/005 |
| | | | | | | 178/19.01 |
| 2014/0064820 | A1 | | 3/2014 | Mach | | |

FOREIGN PATENT DOCUMENTS

| CN | 201662788 U | 12/2010 |
|---|---|---|
| CN | 103264594 A | 8/2013 |
| CN | 103618349 A | 3/2014 |
| CN | 203561957 U | 4/2014 |
| CN | 203854363 U | 10/2014 |
| CN | 204263751 U | 4/2015 |

\* cited by examiner

*Primary Examiner* — David Walczak
(74) *Attorney, Agent, or Firm* — Gokalp Bayramoglu

(57) ABSTRACT

A multifunctional pen includes a penholder and a refill provided in the penholder. A clip is provided on the penholder. The penholder comprises an upper penholder and a lower penholder hinged to each other. The lower penholder may bend and tilt toward the upper penholder through a hinged joint. The clip is arranged on the upper penholder and across the upper penholder and the lower penholder. A tail end of the clip is raised and a pressing raised strips for a mobile phone is provided thereon.

21 Claims, 7 Drawing Sheets

MULTIFUNCTIONAL PEN

TECHNICAL FIELD OF THE INVENTION

The present invention relates to a pen, in particular to a multifunctional pen that may serve as a stand for a mobile phone.

BACKGROUND OF THE INVENTION

At present, mobile phones, as one important communication tool, have been used by more and more people because they are convenient to carry around. With the popularity of mobile phones, functions of mobile phones are becoming increasingly diverse. With the functional development of mobile phones, mobile phones have become indispensable for people's recreation. People may watch movies, listen to music and play games on their mobile phones, specifically, people may movies and listen to music for relax in their offices. However, people usually will not carry a stand for a mobile phone to any office occasion, and it is not conducive for relaxation to watch a movie by holding a mobile phone by hands. Therefore, a multifunctional pen, which is suitable for office occasions, capable of holding a mobile phone, and convenient to carry, becomes necessary.

SUMMARY OF THE INVENTION

In order to solve the technical problem, the present invention designs a multifunctional pen that may serve as a stand for a mobile phone.

The present invention employs the following technical solution.

A multifunctional pen is provided, including a penholder and a refill provided in the penholder, a clip being provided on the penholder, the penholder includes an upper penholder and a lower penholder hinged to each other, and the lower penholder can be bent and inclined toward the upper penholder through the hinged joint; the clip is arranged on the upper penholder and spanned across the upper penholder and the lower penholder, and a mobile phone holding raised-strip is convexly provided inward at a tail end of the clip. Compared with the prior art, an upper penholder and a lower penholder of the multifunctional pen are hinged to each other, the lower penholder can be bent and inclined toward the upper penholder through the hinged joint, and a mobile phone holding raised-strip is convexly provided inward at a tail end of the clip. By placing the pen on a desktop flatly with its nib facing downward, and bending and inclining the lower penholder, through the inclined lower penholder and the mobile phone holding raised-strip, a mobile phone may be leaned on the inclined lower penholder and resisted against the mobile phone holding raised-strip. In this way, it is convenient to hold a mobile phone and get relaxed in the office, and such a multifunctional pen is suitable for office occasions. The placement angle of a mobile phone may be adjusted by adjusting a bending and inclining angle of the lower penholder, and the multifunctional pen is convenient to carry around when it is kept upright.

Preferably, a hinged end of the upper penholder is a concave arc surface, a hinged end of the lower penholder is a convex arc surface, the hinged end of the lower penholder is hinged to the middle of the concave arc surface, and the lower penholder can be bent and inclined toward the upper penholder through the hinged joint at an angle of 0° to 120°.

Preferably, a hinged end of the upper penholder is a concave arc surface, a hinged end of the lower penholder is a convex arc surface, the hinged end of the lower penholder is hinged to the middle of the concave arc surface, and the lower penholder can be bent through the hinged joint at a maximum angle of 100° to 130°.

Preferably, a hinged shaft of the upper penholder and the lower penholder is offset toward a side, far away from the clip, of an axis of the lower penholder. Therefore, the lower penholder may be bent only toward a side far away from the clip, to form a stand for a mobile phone.

Preferably, two ends of the concave arc surface extend in a horizontal plane to serve as an unbent holding plane when the lower penholder is kept unbent and a bent holding plane when the lower penholder is bent to the maximum extent; the unbent holding plane is parallel to an axis of the upper penholder; and an included angle between the bent holding plane and the axis of the upper penholder is the same as a maximum bending angle of the lower penholder. The two holding planes position and limit two extreme positions of the lower penholder, respectively.

Preferably, a tail end of the unbent holding plane is in transition to an outer side wall of the upper penholder by an inclined outward and downward flat surface or arc surface. The lower penholder can be engaged with a lower end of the upper penholder better when the lower penholder is kept unbent.

Preferably, the convex arc surface of the hinged end of the lower penholder uses the hinged shaft as the axis; one side, far away from the clip, of the convex arc surface is in tangential transition to an outer wall of the lower penholder; one side, close to the clip, of the convex arc surface is in tangential transition to a stepped surface parallel to the axis of the lower penholder; and the stepped surface is fitted with the unbent holding plane, and forms a step together with the lower penholder body.

Preferably, an outer side surface of the clip is a flat surface, and the clip is on a side opposite to a bending direction of the penholder. The lower penholder is bent to serve as a backrest for a mobile phone, and at this time, the outer side of the clip is placed on the desktop and the lower penholder is bent upward to provide stable support.

Preferably, the width of the clip is not less than the diameter of the upper penholder.

Preferably, an inner side of the clip is fixedly connected to a lower end of the upper penholder by a support. The clip provides for fixed connection to an upper end and a lower end of the upper penholder, respectively. The multifunctional pen is different from a conventional pen. A clip of the conventional pen is used for being clamped on a pocket for fixation, while the pen of the present invention is used as a bottom support when the lower penholder is bent to serve as a stand for a mobile phone. Therefore, a support formed at a lower end of the hinge joint of the upper penholder and the low penholder serves as a second support, and this may better ensure stable support.

Preferably, the support is located on an axis extension line of the lower penholder when bent to the maximum extent; or arranged approximately to a side, toward the tail end of the clip, of the axis extension line of the lower penholder when bent to the maximum extent.

Preferably, a soft rubber ring is provided at a top end of the upper penholder and a bottom end of the lower penholder, respectively. It is convenient to carry the pen around through the soft rubber ring without stabbing users. Meanwhile, the soft rubber ring may control a touch screen of a mobile phone so that the pen may be used as a control pen for the mobile phone, to prevent fingertips from becoming uncomfortable when controlling the touch screen by fingers for a long time when in too dry or wet days.

Preferably, the refill is arranged in the lower penholder; and the lower penholder is divided into two segments capable of rotating relative to each other, and the relative rotation of the two segments controls the refill to stretch and retract.

Preferably, a hinged column is convexly provided in the middle of the concave arc surface; the hinged end of the lower penholder is a U-shaped collet when viewed from the side, and the U-shaped collet is clamped on the hinged column for hinging, and the convex arc surface of the lower penholder is resisted against the concave arc surface.

Preferably, a switch is provided on a side surface of the upper penholder, and an illuminating lamp, controlled by the switch, is provided at the top end of the upper penholder.

Further preferably, a switch is provided on a side surface of the upper penholder, and a laser lamp, controlled by the switch, is provided at the top end of the upper penholder. A laser pen may be provided at the top end of the upper penholder for indication in computer PPT presentations.

Further preferably, a USB connection signal terminal, which can be pulled out to be inserted into a computer, is embedded on the side surface of the upper penholder; and a remote control button, corresponding to the USB connection signal terminal, is provided on the other side of the upper penholder. The USB connection signal terminal, which can be pulled out, is arranged on the side surface of the upper penholder, the button on the upper penholder may be replaced with a flip button; and the USB connection signal terminal is pulled out and inserted into a computer, and then a computer PPT or other software is remotely controlled to page through signal connection of the USB connection signal terminal by the switch on the upper penholder, the switch thus to be used as a remote control for PPT presentations.

Preferably, a reflective strip is provided on the upper penholder. It is convenient to find the multifunctional pen in dark or at night through the reflective strip.

In the present invention, the lower penholder may be bent and inclined toward the upper penholder through the hinged joint, and the multifunctional pen is placed on the desktop with the outer side surface of the clip facing downward to serve as a stand for a mobile phone; the soft rubber ring at the tail end of the lower penholder may control the touch screen of a mobile phone, so that the pen may be used as a control pen for a mobile phone, to prevent fingertips from becoming uncomfortable when controlling the touch screen by fingers for a long time when in too dry or wet days. An illuminating lamp or a laser lamp may be arranged on the upper penholder, or the upper penholder may be used as a remote control for computer PPT presentations through the USB signal terminal. The multifunctional pen of the present invention is integrated with associated functions of a plurality of electronic products, and thus suitable to carry around for use with a mobile phone or computer.

in which: 1, upper penholder; 2, lower penholder; 3, clip; 4, concave arc surface; 5, reflective strip; 6, soft rubber ring; 7, mobile phone holding raised-strip; 8, convex arc surface; 9, mobile phone; 10, switch; 11, illuminating lamp; 12, support; 13, bent holding plane; 14, unbent holding plane; 15, stepped surface; 16, U-shaped collet; and 17, hinged column.

DETAILED DESCRIPTION OF THE INVENTION

The technical solutions of the present invention will be further described specifically by specific embodiments and with reference to the accompany drawings.

Embodiment 1

Figure 1:
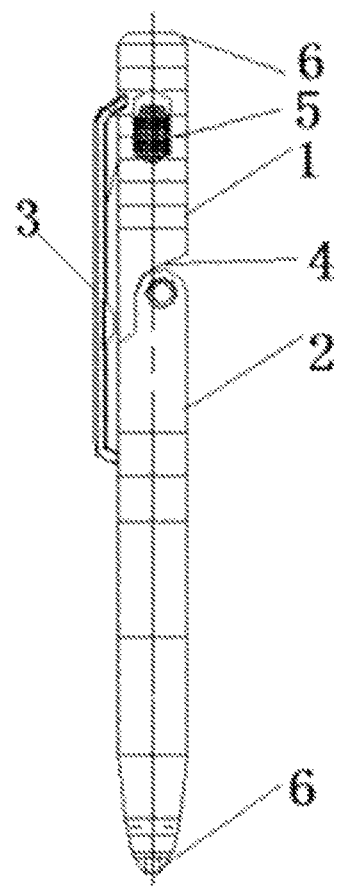
FIG. 1 is a schematic diagram of a structure according to the present invention.
Figure 2:
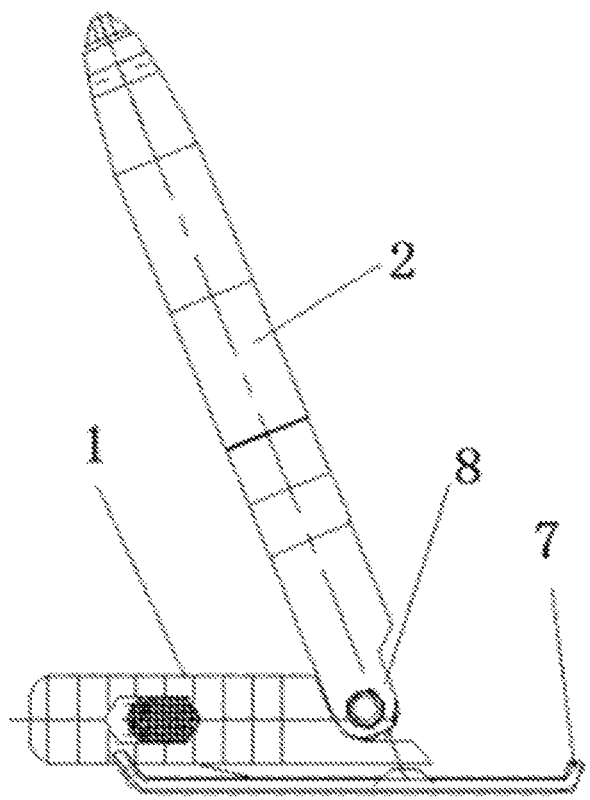
FIG. 2 is a schematic structural diagram, when a lower penholder is bent to a maximum angle, according to the present invention.
Figure 3:
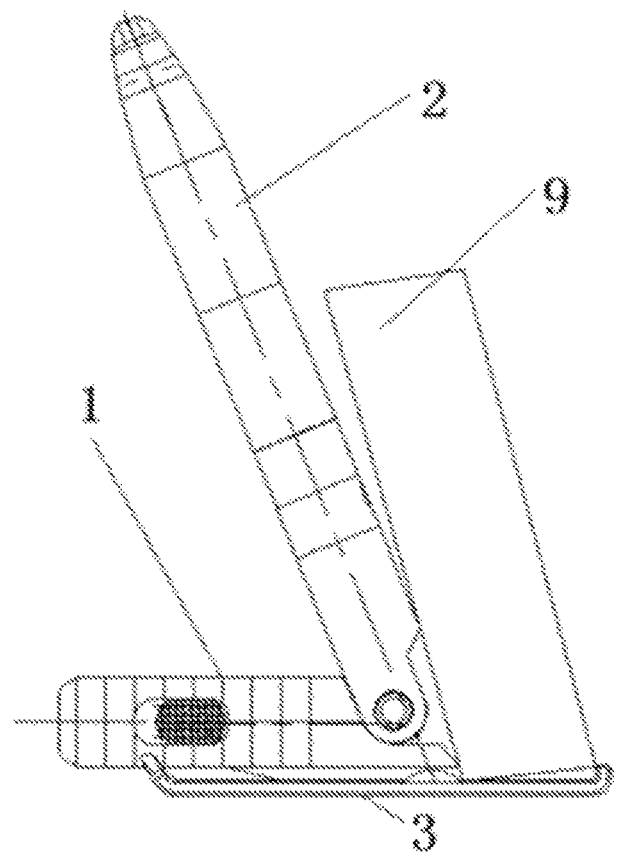
FIG. 3 is a usage state diagram when a mobile phone is leaned on the pen according to the present invention.

As shown in FIG. 1, FIG. 2 and FIG. 3, a multifunctional pen is provided, including a penholder and a refill provided in the penholder, a clip 3 being provided on the penholder, the penholder includes an upper penholder 1 and a lower penholder 2 hinged to each other, and the lower penholder can be bent and inclined toward the upper penholder through the hinged joint; the clip is arranged on the upper penholder and spanned across the upper penholder and the lower penholder, and a mobile phone holding raised-strip 7 is convexly provided inward at a tail end of the clip. A hinged end of the upper penholder is a concave arc surface 4, a hinged end of the lower penholder is a convex arc surface 8, the hinged end of the lower penholder is hinged to the middle of the concave arc surface, and the lower penholder can be bent and inclined toward the upper penholder through the hinged joint at an angle of 0° to 120°. A soft rubber ring 6 is provided at a top end of the upper penholder and a bottom end of the lower penholder, respectively, and a reflective strip 5 is provided on the upper penholder.

The upper penholder and the lower penholder of the multifunctional pen are hinged to each other, the lower penholder can be bent and inclined toward the upper penholder through the hinged joint, and a mobile phone holding raised-strip is convexly provided inward at a tail end of the clip. By placing the pen on a desktop flatly with its nib contacting the desktop, the lower penholder is rotated with respect to the upper penholder, such that through the inclined lower penholder and the mobile phone holding raised-strip, a mobile phone 9 may be leaned on the inclined lower penholder and resisted against the mobile phone holding raised-strip. In this way, it is convenient to hold a mobile phone and get relaxed in the office, and such a multifunctional pen is suitable for office occasions. The placement angle of a mobile phone may be adjusted by adjusting a bending and inclining angle of the lower penholder, and the multifunctional pen is convenient to carry around when it is kept upright.

This embodiment is merely a preferred solution of the present invention and is not intended to limit the present invention in any forms. Other variations and modifications may be made without departing from the technical solutions recorded in the claims.

Embodiment 2

Figure 4:
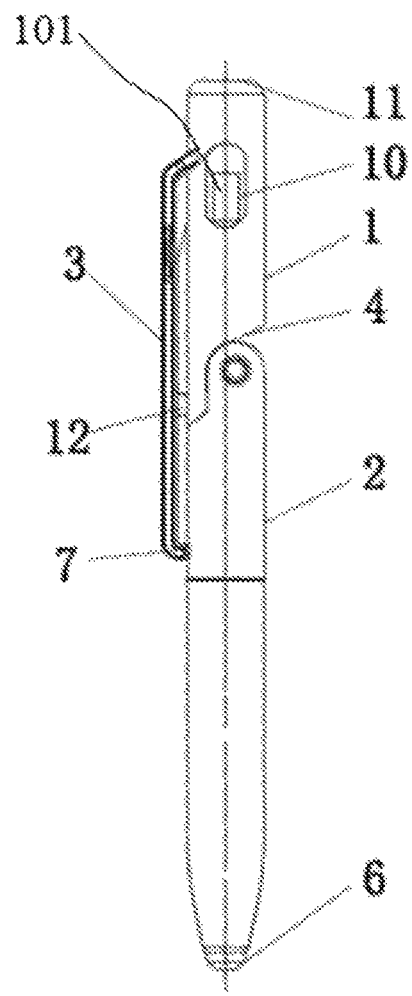
FIG. 4 is a schematic diagram of a second structure according to the present invention.
Figure 5:
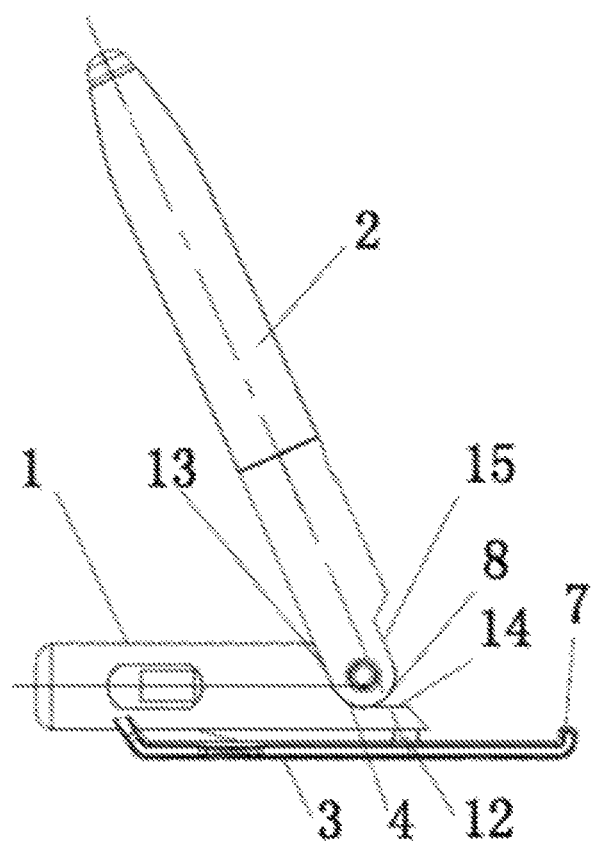
FIG. 5 is a bending diagram of the second structure according to the present invention.

As shown in FIG. 4 and FIG. 5, a multifunctional pen is provided, including a penholder and a refill, the penholder including an upper penholder 1 and a lower penholder 2, a clip 3 being provided on the penholder 1. The refill is arranged in the lower penholder 2, the lower penholder is divided into two segments capable of rotating relative to each other, and the relative rotation of the two segments enables the refill to extend from and retract to the lower penholder. The upper penholder is hinged to the lower penholder, and may be bent and inclined toward to the upper penholder through the hinged joint; the clip 3 is arranged on a side, opposite to a bending direction of the lower penholder, of the upper penholder 1, a tail end of the clip extends to the lower penholder, and a mobile phone holding raised-strip 7 is convexly arranged inward at the tail end of the clip; an outer side surface of the clip is a flat surface, and a semi-circular wingspan portion raised outward is provided on two sides of the clip 3; and an inner side surface of the clip is fixedly connected to a lower end of the upper penholder by a support 12, and the semi-circular wingspan portion and the support 12 form more stable support when supporting a mobile phone.

Figure 7:
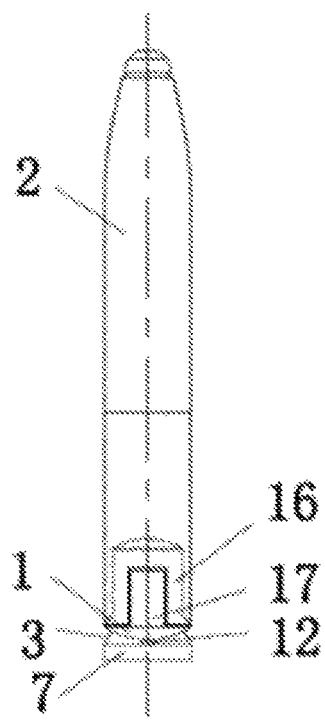
FIG. 7 is a structural diagram of connection of hinged ends of the upper penholder and the lower penholder according to the present invention.

A hinged end of the upper penholder is a concave arc surface 4, a hinged end of the lower penholder is a convex arc surface 8, and the hinged end of the lower penholder is hinged to the middle of the concave arc surface. As shown in FIG. 7, a hinged column 17 is convexly provided in the middle of the concave arc surface 4; the hinged end of the lower penholder is a U-shaped collet 16 when viewed from the side, and the U-shaped collet is clamped on the hinged column for hinging, and the convex arc surface 8 of the lower penholder is resisted against the concave arc surface. Two ends of the concave arc surface extend in a horizontal plane to serve as an unbent holding plane 14 when the lower penholder is kept unbent and a bent holding plane 13 when the lower penholder is bent to the maximum extent; the unbent holding plane 14 is parallel to an axis of the upper penholder 1; and a tail end of the unbent holding plane is in transition to an outer side wall of the upper penholder by an inclined outward and downward flat surface. An included angle between the bent holding plane 13 and the axis of the upper penholder 1 is the same as a maximum bending angle of the lower penholder. The lower penholder may be bent to the upper penholder through the hinged joint at a maximum angle of 120°. The convex arc surface 8 of the lower penholder 2 uses a hinged shaft as the axis; one side, far away from the clip, of the convex arc surface is in tangential transition to an outer wall of the lower penholder; one side, close to the clip, of the convex arc surface is in tangential transition to a stepped surface 15 parallel to the axis of the lower penholder; and the stepped surface is fitted with the unbent holding plane, and has misalignment from and forms a step with the lower penholder body. A switch 10, which may be toggled up and down, is arranged on a side surface of the upper penholder; an illuminating lamp, which is controlled to be on and off by the switch, is arranged at the top end of the upper penholder; a laser pen, which is controlled by the switch, may be arranged at the top end of the upper penholder for indication in computer PPT presentations; or a USB connection signal terminal 101, which can be pulled out, is arranged on the side surface of the upper penholder, the switch of the upper penholder may be replaced with a flip button, the USB connection signal terminal 101 is pulled out and inserted into a computer, and then a computer PPT or other software is remotely controlled to page through signal connection of the USB connection signal terminal 101 by the switch on the upper penholder, and the switch is thus used as a remote control for PPT presentations. The bottom end of the lower penholder is a refill extend/retract, a soft rubber ring 6 is arranged around the refill extend/retract, and, the soft rubber ring may be used as a contact for a touch screen of a mobile phone to control screen sliding of the mobile phone, and meanwhile used for protecting ends of the multifunctional pen.

Figure 6:
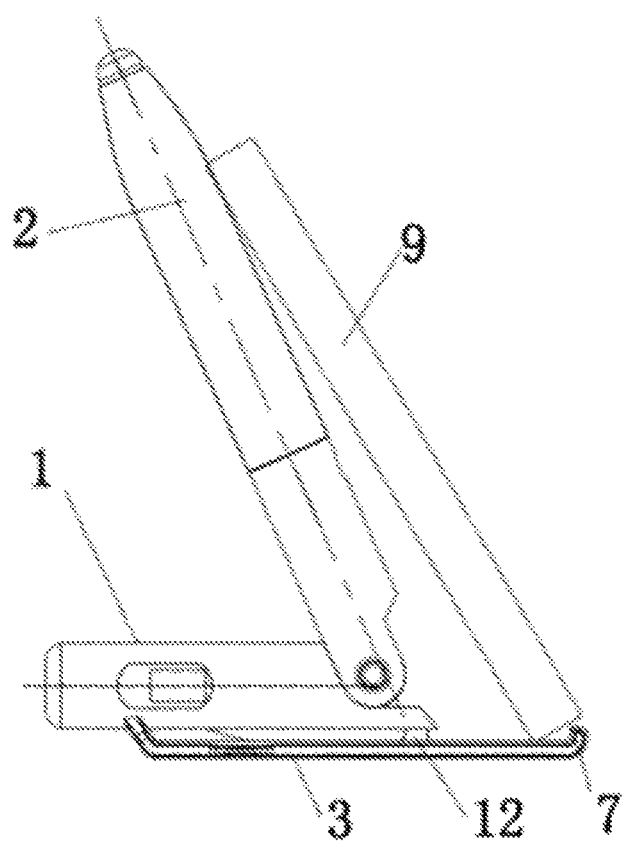
FIG. 6 is a usage state diagram, when a mobile phone is leaned on the pen, according to the second structure of the present invention.

The upper penholder and the lower penholder of the multifunctional pen are hinged to each other, the lower penholder may be bent and inclined toward to the upper penholder through the hinged joint; a mobile phone holding raised-strip is convexly arranged inward at the tail end of the clip; and the lower penholder is bent and inclined, the outer side surface of the clip is placed on a desktop, and through the inclined lower penholder and the mobile phone holding raised-strip, a mobile phone 9 may be leaned on the inclined lower penholder and resisted against the mobile phone holding raised-strip, as shown in FIG. 6. In this way, it is convenient to hold a mobile phone and get relaxed in the office. The soft rubber ring at the tail end of the lower penholder may control a touch screen of a mobile phone, so that the pen may be used as a touch pen for a mobile phone, to prevent fingertips from becoming uncomfortable when controlling the touch screen by fingers for a long time when in too dry or wet days. An illuminating lamp or a laser lamp may be arranged on the upper penholder, or the upper penholder may be used as a remote control for computer PPT presentations through the USB signal terminal 101. The multifunctional pen of the present invention is integrated with associated functions of a plurality of electronic products, and thus suitable to carry around for use with a mobile phone or computer.

The invention claimed is:

1. A multifunctional pen, comprising a penholder and a refill provided in the penholder, a clip being provided on the penholder, wherein the penholder comprises an upper penholder and a lower penholder hinged to each other, and the lower penholder is bendable and inclined toward the upper penholder through a hinged joint; the clip is arranged on the upper penholder and spanned across the upper penholder and the lower penholder, and a mobile phone holding raised-strip is convexly provided inward at a tail end of the clip;

wherein a hinged end of the upper penholder is a concave arc surface, a hinged end of the lower penholder is a convex arc surface, the hinged end of the lower penholder is hinged to the middle of the concave arc surface, and the lower penholder is bendable and inclined toward the upper penholder through the hinged joint at an angle.

2. The multifunctional pen according to claim 1, wherein a hinged end of the upper penholder is a concave arc surface, a hinged end of the lower penholder is a convex arc surface, the hinged end of the lower penholder is hinged to the middle of the concave arc surface, and the lower penholder is bendable through the hinged joint at a maximum angle of 100° to 130°.

3. The multifunctional pen according to claim 1, wherein a hinged shaft of the upper penholder and the lower penholder is offset toward a first side, far away from the clip with respect to an axis of the lower penholder.

4. The multifunctional pen according to claim 3, wherein two ends of the concave arc surface extend in a horizontal plane to serve as an unbent holding plane when the lower penholder is kept unbent and a bent holding plane when the lower penholder is bent to the maximum extent; the unbent holding plane is parallel to an axis of the upper penholder; and an inclined angle between the bent holding plane and the axis of the upper penholder is the same as a maximum bending angle of the lower penholder.

5. The multifunctional pen according to claim 4, wherein a tail end of the unbent holding plane is in transition to an outer side wall of the upper penholder by an inclined outward and downward flat surface or arc surface.

6. The multifunctional pen according to claim 5, wherein an inner side of the clip is fixedly connected to a lower end of the upper penholder by a support.

7. The multifunctional pen according to claim 6, wherein the support is located on an axis extension line of the lower penholder.

8. The multifunctional pen according to claim 4, wherein the convex arc surface of the hinged end of the lower penholder uses the hinged shaft as a pivot axis perpendicular to the axis of the upper penholder; a first side, far away from the clip, of the convex arc surface is in tangential transition to an outer wall of the lower penholder; a second side, close to the clip, of the convex arc surface is in tangential transition to a stepped surface parallel to the axis of the lower penholder; and the stepped surface is fitted with the unbent holding plane and forms a step together with the lower penholder body.

9. The multifunctional pen according to claim 4, wherein an inner side of the clip is fixedly connected to a lower end of the upper penholder by a support.

10. The multifunctional pen according to claim 9, wherein the support is located on an axis extension line of the lower penholder.

11. The multifunctional pen according to claim 1, wherein an outer side surface of the clip is a flat surface, and the clip is on an opposite side to a bending direction of the penholder.

12. The multifunctional pen according to claim 11, wherein the width of the clip is not less than the diameter of the upper penholder.

13. The multifunctional pen according to claim 1, wherein an inner side of the clip is fixedly connected to a lower end of the upper penholder by a support.

14. The multifunctional pen according to claim 13, wherein the support is located on an axis extension line of the lower penholder.

15. The multifunctional pen according to claim 1, wherein a hinged column is convexly provided in the middle of the concave arc surface; the hinged end of the lower penholder is a U-shaped collet when viewed from the side, and the U-shaped collet is clamped on the hinged column for hinging, and the convex arc surface of the lower penholder is resisted against the concave arc surface.

16. The multifunctional pen according to claim 1, wherein a soft rubber ring is provided at a top end of the upper penholder and a bottom end of the lower penholder, respectively.

17. The multifunctional pen according to claim 1, wherein the refill is arranged in the lower penholder; and the lower penholder is divided into two segments capable of rotating relative to each other, and the relative rotation of the two segments controls the refill to extend and retract.

18. The multifunctional pen according to claim 1, wherein a switch is provided on a side surface of the upper penholder, and an illuminating lamp, controlled by the switch, is provided at the top end of the upper penholder.

19. The multifunctional pen according to claim 1, wherein a switch is provided on a side surface of the upper penholder, and a laser lamp, controlled by the switch, is provided at the top end of the upper penholder.

20. The multifunctional pen according to claim 1, wherein a USB connection signal terminal is embedded on the side surface of the upper penholder; and a remote control button, corresponding to the USB connection signal terminal, is provided on the other side of the upper penholder.

21. The multifunctional pen according to claim 1, wherein a reflective strip is provided on the upper penholder.

* * * * *